United States Patent [19]

George, Jr.

[11] Patent Number: 5,100,280
[45] Date of Patent: Mar. 31, 1992

[54] MAGNETIC ROLLER AND BELT STEEL SHOT AND GRIT PICK UP RECOVERY MACHINE

[76] Inventor: Woodrow W. George, Jr., 18777 Midway Rd., #611, Dallas, Tex. 75252

[21] Appl. No.: 495,730

[22] Filed: Mar. 19, 1990

[51] Int. Cl.⁵ .......................................... B65G 65/02
[52] U.S. Cl. ...................................... 414/440; 209/38; 198/510.1; 198/690.1; 414/528; 414/441
[58] Field of Search ............... 414/437, 441, 528, 440; 198/510.1, 690.1; 209/38, 215, 247, 248, 373, 375

[56] References Cited

U.S. PATENT DOCUMENTS

| | | | |
|---|---|---|---|
| 1,273,312 | 7/1918 | Baum | 198/510.1 X |
| 1,860,481 | 5/1932 | Royer | 209/248 |
| 2,750,640 | 6/1956 | Butzow | 209/38 |
| 2,881,901 | 4/1959 | Zimmer | 198/690.1 |
| 3,110,148 | 11/1963 | Mader et al. | 414/437 X |
| 3,157,267 | 11/1964 | Asbury | 198/690.1 X |
| 3,587,814 | 6/1971 | Garabedian et al. | 198/510.1 X |
| 3,709,360 | 1/1973 | Baker | 198/510.1 X |
| 4,170,287 | 10/1979 | Edwards et al. | 198/690.1 X |

FOREIGN PATENT DOCUMENTS

| | | | |
|---|---|---|---|
| 3513454 | 10/1986 | Fed. Rep. of Germany | 209/247 |
| 2555455 | 5/1985 | France | 414/441 |
| 76906 | 12/1954 | Netherlands | 414/441 |
| 868230 | 5/1961 | United Kingdom | 414/441 |

*Primary Examiner*—David A. Bucci
*Assistant Examiner*—Robert S. Katz
*Attorney, Agent, or Firm*—Warren H. Kintzinger

[57] ABSTRACT

A machine to collect iron or steel shot or ferrous grit from factory plant floors for reuse in blast machines or other industrial processes. Round doughnut like magnets mounted on a through shaft are stacked together with like North and South poles adjacent one to another in or such as N-SS-NN-SS-NN-SS-NN-SS-NN-SS-NN-S. A drive system includes a floor engaging wheel and a lug pulley and belt drive connected to a gear drive connected to one end of the through shaft that mounts the end to end round magnets extending transversely substantially the width of the machine. A multi-pocketed flexible conveyor belt is passed around the shaft and end to end magnet assembly to extend therefrom up and around idler drum located upward and toward the rear, that being non-magnetic permits iron or steel shot and/or ferrous material grit to dump from the multipocketed belt down to the separating screen. Particles passed through the separating screen are held in a large hopper for delivery return to a supply bin or where desired. The machine is a wheeled unit easily pushed over a factory or foundry floor. Larger machines may be powered driven for ease of operation.

3 Claims, 2 Drawing Sheets

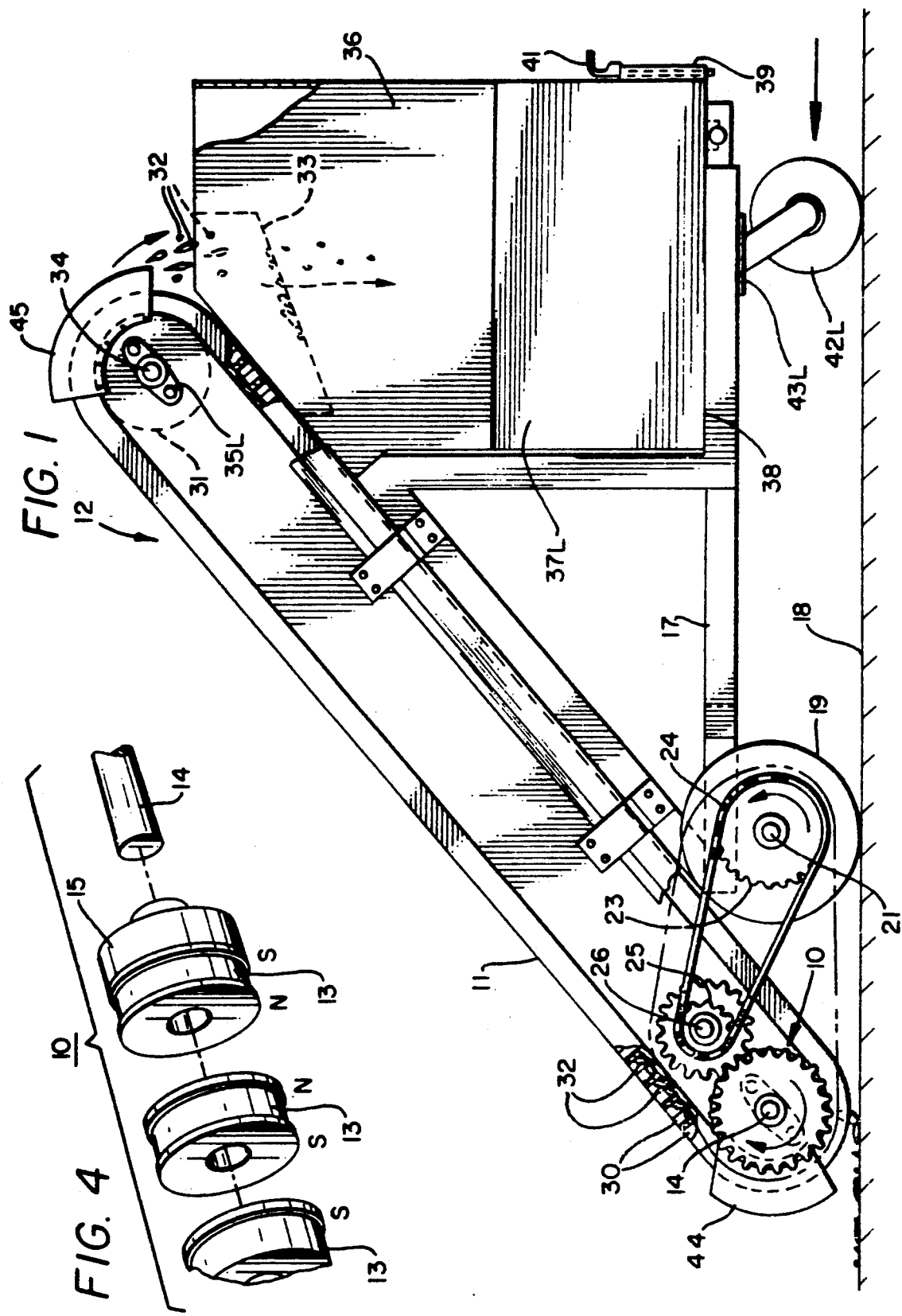

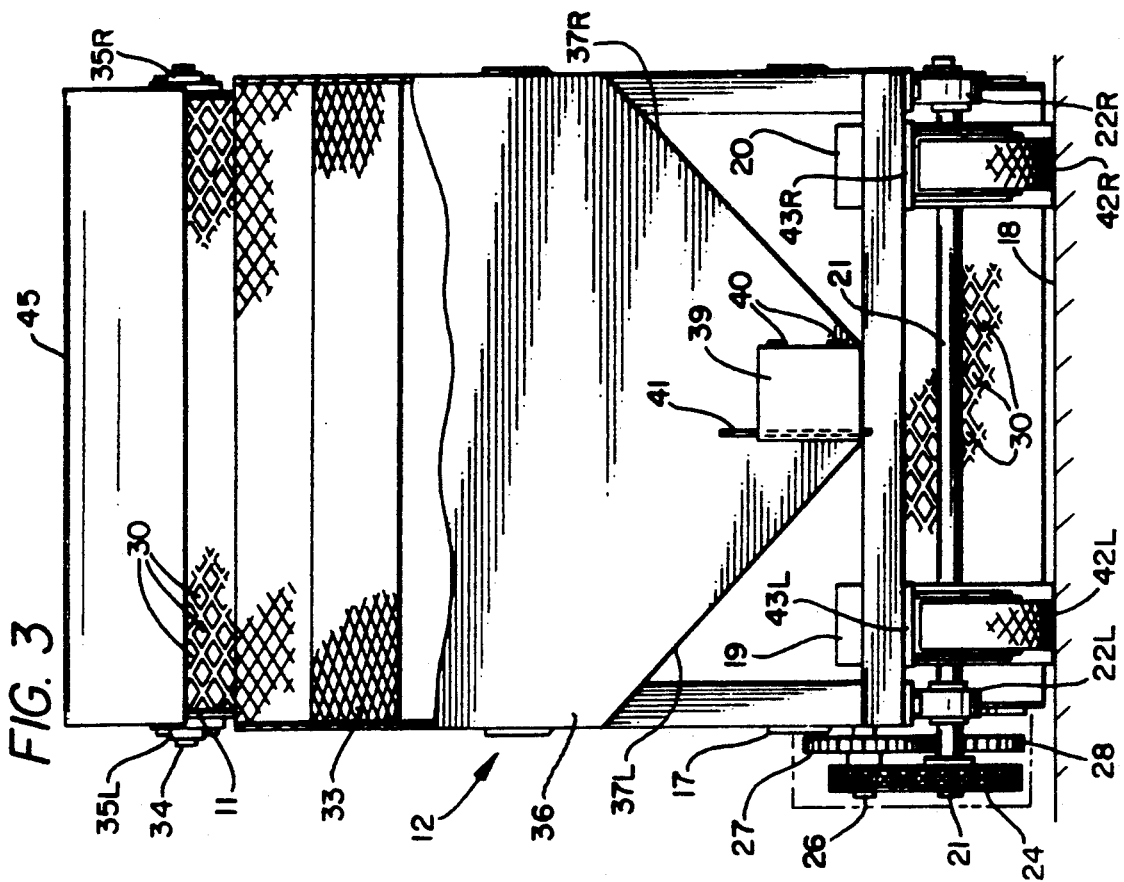
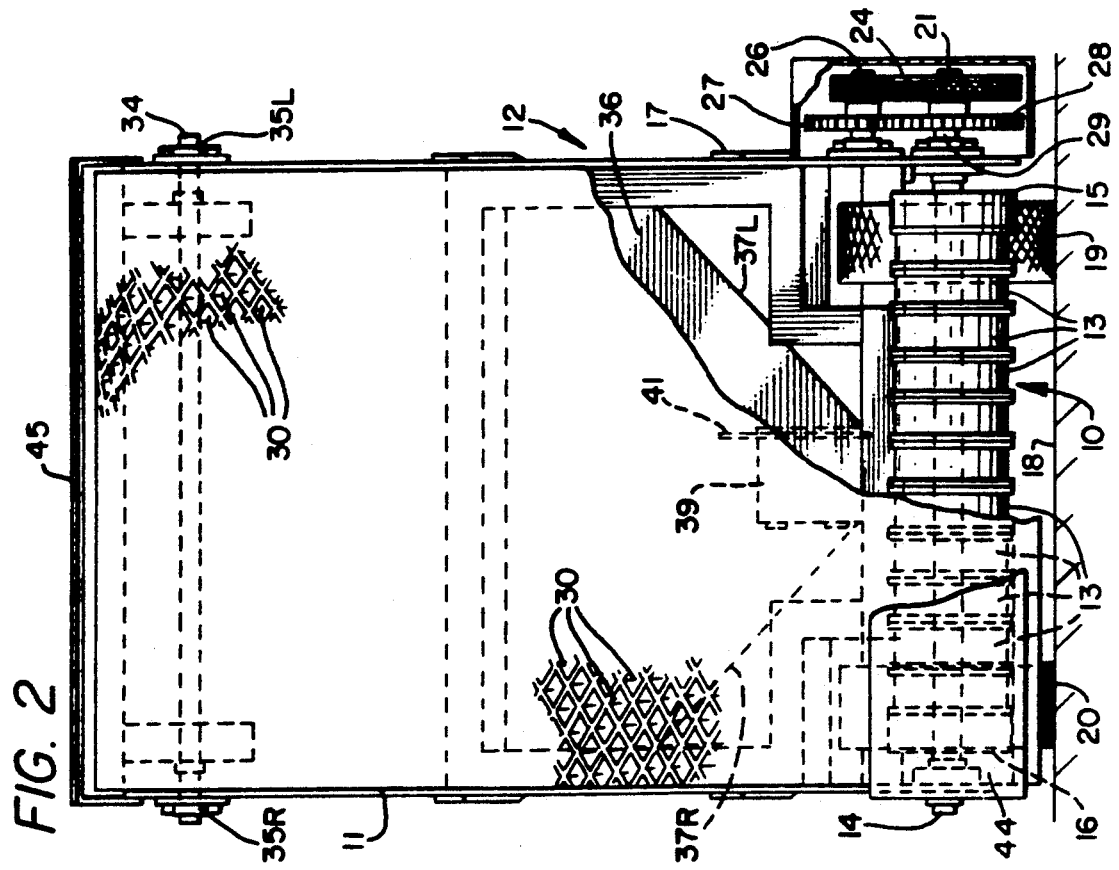

MAGNETIC ROLLER AND BELT STEEL SHOT AND GRIT PICK UP RECOVERY MACHINE

SUMMARY OF THE INVENTION

This invention relates in general to recovery of iron and/or steel shot or ferrous grit from factory plant floors, and more particularly, to a magnetic roller and belt steel shot and ferris grit pick up recovery machine.

There are various ways that iron and steel shot or ferrous grit escape blast cleaning machines such as through leaks, carry out and outright spillage. Such material spread out over a factory floor is quite hazardous with employees slipping and falling with the instability under foot created thereby. Other employees many times sweep it up comingled with other debris throwing it away just to get it out of the way with at the same time purchasing agents ordering more new material continually replacing that thrown away. Such ferrous metal shot and abrasive material consumption should be brought to a halt with a sensible recovery system for both safety reasons and to achieve substantial material savings.

It is therefore a principal object of this invention to significantly reduce abrasive ferrous material consumption with respect to blast cleaning machines via magnetic pick up recovery of iron or steel shot from a factory or foundry floor.

Another object with such recovery is to achieve savings and quick return on investment.

A further object is to provide not only a decrease in clean up time but greater safety from employees slipping and falling on shot.

Still another object is to lessen reclaim system requirements on exit ends of new blast cleaning machines.

Another object is to lessen machine cabinet seal repair requirement expense.

Features of the invention useful in accomplishing the above objects include, in a magnetic roller equipped pocketed belt conveyor iron and steel shot and grit pick up recovery machine, a short magnetic roller belt conveyor system on wheels that clears a fifteen inch or wider path of any ferrous abrasive material from the floor surface, carries it some three to five feet dumping the ferrous material into a screen for removing large objects and through the screen into a hopper receiving recovered ferrous abrasive material The hopper can be emptied from the bottom or removed and emptied. It is a machine useful in collecting iron or steel shot or ferrous grit from factory plant floors for reuse in blast machines or other industrial processes. Round doughnut like magnets mounted on a through shaft are stacked together with like North and South Poles adjacent one to another in orientation or such as N-SS-NN-SS-NN-SS-NN-SS-NN-SS-NN-S. A floor engaging wheel is lug pulley and belt drive connected to a gear drive connected to one end of the through shaft that mounts the end to end round magnets extending transversely substantially the width of the machine. A multi-pocketed flexible belt is passed around the shaft and end to end magnet assembly to extend therefrom up and around the idler drum located upward and toward the rear, that being non-magnetic permits iron or steel shot and/or ferrous material grit to dump from the multi-pocketed belt down to a separating screen. Particles passed through the separating screen are held in a large hopper for delivery return to a supply bin or where desired. The machine is a wheeled unit easily pushed over a factory or foundry floor. Larger machines may be powered driven for ease of operation.

BRIEF DESCRIPTION OF THE DRAWINGS

A specific embodiment representing what is presently regarded as the best mode of carrying out the invention is illustrated in the accompanying drawings.

In the drawings:

FIG. 1 represents a partially broken away and sectioned side elevation view of the magnetic roller and belt steel shot and grit pick up recovery machine;

FIG. 2, a partially broken away and sectioned front elevation view of the machine of FIG. 1;

FIG. 3, a partial broken away and sectioned rear elevation view of the machine of FIGS. 1 and 2; and, FIG. 4, a partial exploded view of round doughnut like magnets and the shaft they mount on.

DETAILED DESCRIPTION OF THE DRAWINGS

Referring to the drawings:

The magnetic roller 10 and belt 11 steel and grit pick up recovery machine 12 of FIGS. 1-3 is used to collect iron or steel shot or ferrous grit from factory plant floors or foundry floors for reuse in blast machines or other industrial processes. Referring also to FIG. 4 round doughnut like magnets 13 are mounted on through rotational drive shaft 14 between retainer disc 15 on the left and retainer disc 16 on the right with like North and South poles adjacent one to another in orientation such as N-SS-NN-SS-NN-SS-NN-SS-NN-SS-NN-S. The machine carriage 17 has front floor 18 engaging wheels 19 and 20 with wheel 19 non rotatably fixed to shaft 21 rotatably mounted in the carriage 17 bearings 22L and 22R and wheel 20 is rotatably mounted on shaft 21. Shaft 21 is extended on the left to a lug pulley 23 to drive a lug belt 24 that in turn drives lug pulley 25 that is drive connected via rotatable shaft 26, rotatably mounted on the carriage frame, to spur drive gear 27. Gear 27 meshes with and drives gear 28 mounted on an outboard end 29 of shaft 14 for drive thereof and magnets 13 mounted thereon. The belt 11 is a multi-pocketed 30 flexible belt 11 passes around the shaft 14 and the end to end magnets 13 assembly mounted thereon and extends therefrom up and around an idler drum 31 upward and toward the rear of the machine 12 where the belt 11 as a conveyor belt running around non magnetic idler drum 31 permits iron or steel shot and/or ferrous material grit 32 transported in conveyor belt pockets 30 to dump from thr multi-pocketed 30 flexible belt 11 down to within the separating screen 33 structure. Non magnetic idler drum 31 is mounted on shaft 34 rotatably mounted by opposite end bearing assemblies 35L and 35R in order that pocketed belt 11 freely roll therearound to return back down to the magnetic roller 10 in continuing conveyor motion as induced by the lugged pulley and belt and gear drive thereto.

Ferrous metal shot and grit passed through the screen structure 33, that holds back large objects not passed by the screen, fall into and are retained in hopper 36, that has the capacity for retaining many hundreds of pounds of recovered shot and ferrous grit, mounted on the rear end of the carriage 17. It is so positioned beneath the raised rear end of the conveyor belt 11 structure so as to receive recovered material dumped therefrom. The recovered material holding hopper 36 opposite bottom sides 37L and 37R are slanted down to a bottom 38 the width of and longitudinally in alignment with the hopper dumping door 39 hinge 40 and lock rod 41 held in place on the bottom rear of hopper 36 for dumping from the hopper into a blast machine or to storage. This may be accomplished with the hopper 36 in place in the recovery machine or removed for dumping and return to the machine 12. Rear wheels 42L and 42R caster structures 43L and 43R are mounted to the bottom of machine carriage 17 beneath the hopper 36 for support at the rear of the machine 12 particularly when the hopper 36 holds hundreds of pounds of recovered material.

The machine 12 shown is a hand pushed unit with left side wheel 19 drive connected to drive the conveyor belt 11 structure in conveying magnetically recovered shot and grit from the front bottom magnetic pick up end to the raised rear dumping end and return down to the front bottom end. A transversely extended shield and bumper 44 is mounted at opposite side ends to the machine to protect the magnetic roller 10 from the front, and an additional shield 45 transversely extended over and to the rear of the rear end of the conveyor structure is mounted at opposite ends to opposite sides of the machine for conveyor protection. Wheel 20 being rotatably mounted on shaft 14 and rear wheels 42L and 42R being caster mounted contributes to ease of manual handling of the machine. Typically the machine described could clear a path twenty inches wide, or wider, of ferrous abrasive from a floor surface with each pass of the machine thereover.

A standard model that is to be made available is twenty seven inches wide by forty two inches high by forty eight inches long, will weight (empty) approximately one hundred twenty pounds, and have a load capacity of eight hundred pounds recovered ferrous abrasive. While the embodiment enclosed has a ground wheel to conveyr drive, smaller units could have a rear top hand crank drive, and other units, particularly larger units, could be equipped with motor driven conveyor power drives and even ground engaging wheel motor drive.

Whereas this invention has been described primarily with respect to a single embodiment thereof, it should be realized that various changes may be made without departure from the essential contributions to the art made by the teachings hereof.

I claim:

1. A magnetic roller and conveyor belt ferrous shot and grit pick up recovery machine comprising: a multi-wheel carriage; a multi-magnet conveyor roller mounted on the front of said multi-wheeled carriage at a low level; a conveyor rear roller mounted upwardly and to the rear in said carriage from said multi-magnet conveyor roller; and endless closed loop conveyor belt having a multi-pocketed outer surface mounted on and passing around said multi-magnet conveyor roller and said rear roller; and drive means connected to said multi-magnet conveyor roller of said ferrous material recovery machine; wherein said multi-wheel carriage has opposite side supporting surface engaging wheels at the front and wheel means at the rear; said multi-magnet conveyor roller and said conveyor belt are spaced closely enough at their low point from the supporting surface, that said surface engaging wheels and said wheel means permit the carriage to roll on the supporting surface and the multi-magnet roller to roll a short distance above the supporting surface, to attract and pick up loose ferrous metal material from the supporting surface into pockets of the multi-pocketed outer surface of said endless closed loop conveyor belt as it passes around said multi-magnet conveyor roller; said rear roller is non magnetic to permit dumping of ferrous material from pockets of said multi-pocketed endless closed loop conveyor belt as the belt passes around said rear roller and the conveyor pockets pass in transition from an upright state to an inverted state; and wherein ferrous material receiving means is positioned to receive ferrous material being dumped from pockets of said multi-pocketed endless closed loop conveyor belt as the belt passes around said rear roller and the conveyor pockets pass in transition from an upright state to an inverted state; said ferrous material receiving means is a hopper mounted on the rear end of said multi-wheeled carriage; a separating screen structure is mounted in the path of ferrous material falling from said closed loop conveyor belt as the belt passes around said rear roller and the conveyor pockets pass in transition from an upright state to an inverted state; said wheel means are two opposite side caster mounted wheels mounted to the rear bottom of the frame of said multi-wheeled carriage; one of said opposite side supporting surface engaging wheels at the front is connected to drive said multi-magnet conveyor roller and said endless closed loop conveyor belt when the machine is being rolled forward on the supporting surface; said drive means includes one said supporting surface engaging wheel, a lug pulley and belt system, and a gear drive connected to an end of a rotatably bearing mounted shaft that is a through shaft of said multi-magnet conveyor roller; and wherein said multi-magnet conveyor roller is assembled from round doughnut shaped magnets, mounted on said through shaft, stacked together with North and South poles adjacent one to another in orientation N-SS-NN-SS-NN-SS-NN-SS-NN-SS-NN-S.

2. The magnetic roller and conveyor belt ferrous material recovery machine of claim 1, wherein said hopper has a bottom rear recovered material dump door that is openable to the rear.

3. A magnetic roller and conveyor belt ferrous shot and grit pick up recovery machine comprising: a multi-wheeled carriage; a multi-magnetic conveyor roller mounted on the front of said multi-wheeled carriage at a low level; a conveyor rear roller mounted upwardly and to the rear in said carriage from said multi-magnet conveyor roller; and endless closed loop conveyor belt having a multi-pocketed outer surface mounted on and passing around said multi-magnet conveyor roller and said rear roller; and drive means connected to said multi-magnet conveyor roller of said ferrous material recovery machine; wherein said multi-wheeled carriage has opposite side supporting surface engaging wheels at the front and wheel means at the rear; said multi-magnet conveyor roller and said conveyor belt are spaced closely enough at their low point from the supporting surface, that said surface engaging wheels and said wheel means permit the carriage to roll on the supporting surface and the multi-magnet roller to roll a short distance above the supporting surface, to attract and pick up loose ferrous metal material from the supporting surface into pockets of the multi-pocketed outer surface of said endless closed loop conveyor belt as it passes around said multi-magnet conveyor roller; said rear roller is non magnetic to permit dumping of ferrous material from pockets of said multi-pocketed endless loop conveyor belt as the belt passes around said rear roller and the conveyor pockets pass in transition from an upright state to an inverted state; and wherein ferrous material receiving means is positioned to receive ferrous material being dumped from pockets of said multi-pocketed endless closed loop conveyor belt as the belt passes around said rear roller and the conveyor pockets pass in transition from an upright state to an inverted state; wherein one of said opposite side supporting surface engaging wheels at the front is drive means connected to drive said multi-magnet conveyor roller and said endless closed loop conveyor belt when the machine is being rolled forward on the supporting surface; said drive means includes one said supporting surface engaging wheel, a lug pulley and belt system, and a gear drive connected to an end of said rotatably bearing mounted shaft that is a through shaft of said multi-magnet conveyor roller; and wherein said multi-magnet conveyor roller is assembled from round doughnut shaped magnets, mounted on said through shaft, stacked together with North and South poles adjacent one to another in orientation N-SS-NN-SS-NN-SS-NN-SS-NN-SS-NN-S.

* * * * *